Figure 1:
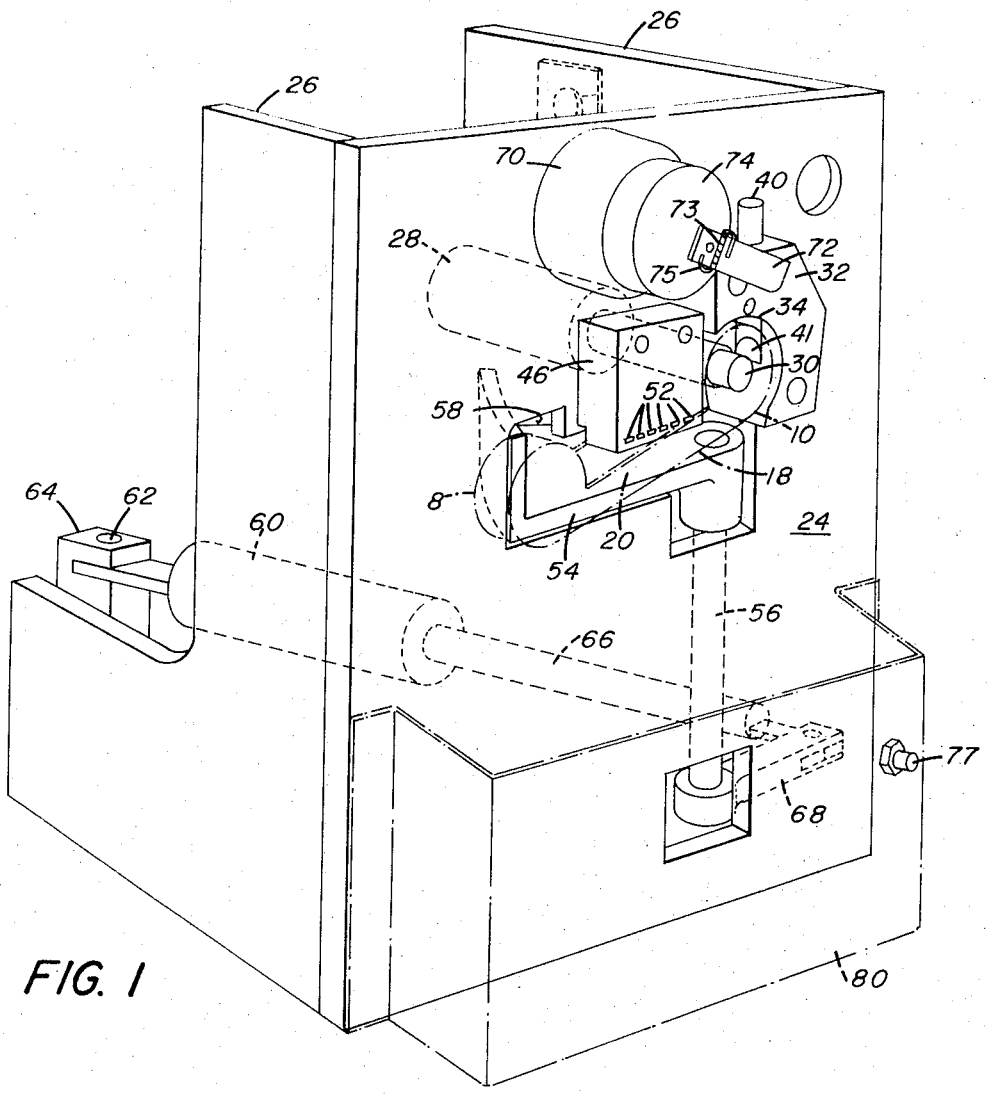
Figure 2:
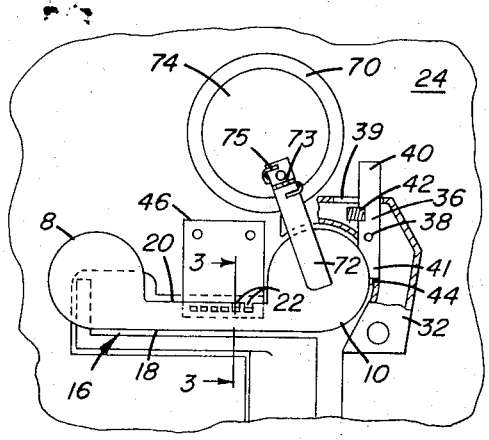
Figure 3:
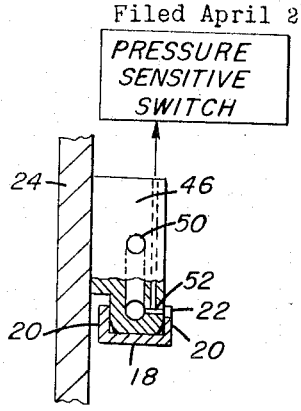
Figure 4:
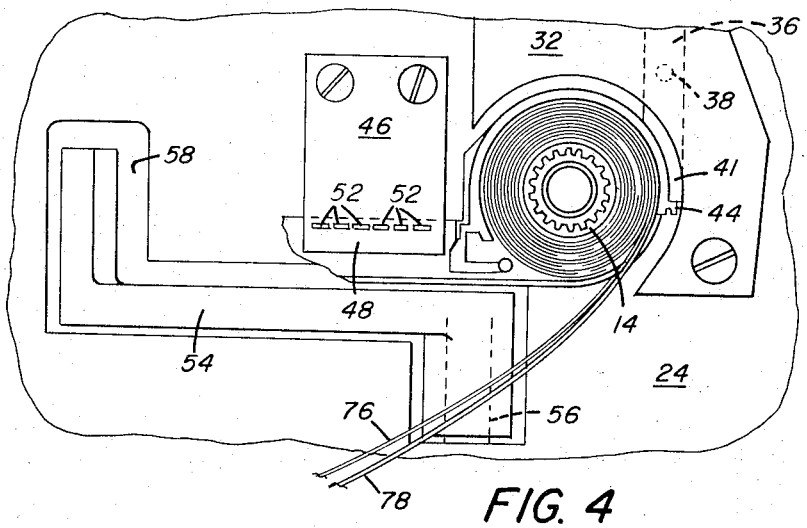
Figure 6:
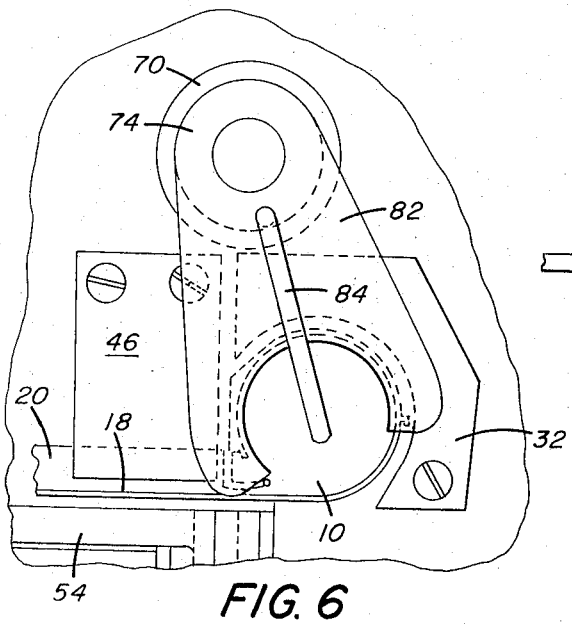
Figure 5:
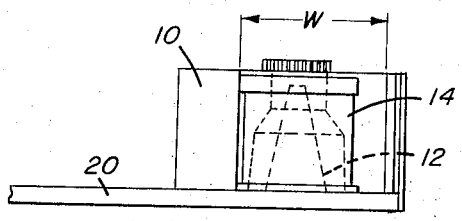
Figure 7:
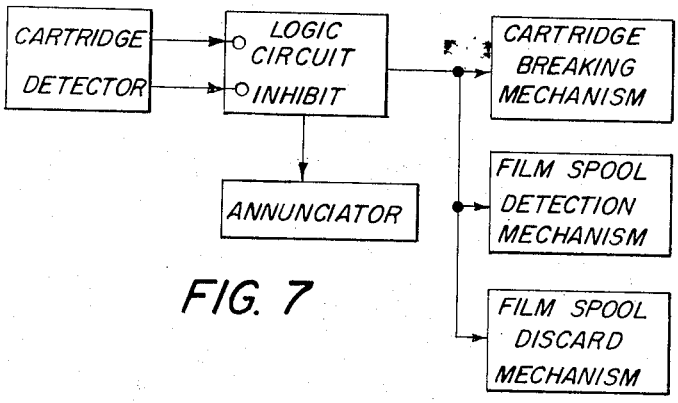

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 8

T925,002

FILM CARTRIDGE OPENING DEVICE

Robert S. Rosborough and Harold C. Pierce, both of 1669 Lake Ave., Rochester, N.Y. 14650

Filed Apr. 2, 1973, Ser. No. 347,271
**Int. Cl. B26f *3/00***
U.S. Cl. 225—103
2 Sheets Drawing. 16 Pages Specification

A film cartridge opening device for film cartridges of the type having a supply chamber, a take-up chamber, and a box-like exposure platform rigidly interconnecting the chambers. The take-up chamber of a cartridge is mounted on a spindle, and the cartridge rotated on the spindle until the exposure platform is moved onto a fixed detector head. The detector head has fluidic ports for sensing notches in the exposure platform indicating the type of film contained in the cartridge. The detecting system is preset to sense a predetermined type of cartridge and film, and if such cartridge is sensed, the cartridge breaking mechanism will operate, when actuated, to break the cartridge and permit removal of the film therefrom. If a cartridge containing a different type of film is sensed by the detecting system, the cartridge breaking mechanism

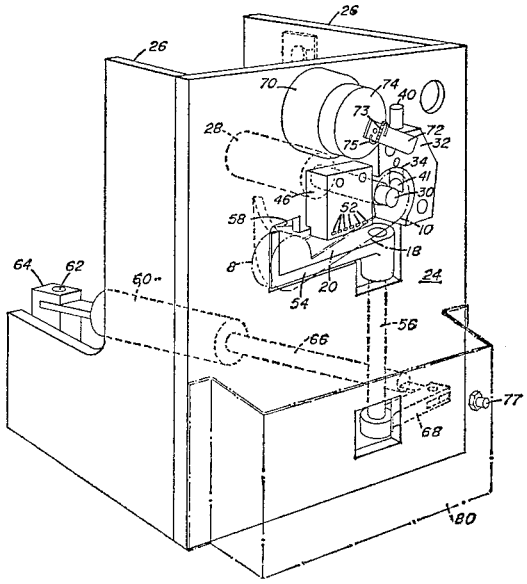

will not operate, if actuated, and a signal device will be actuated. The breaking of the cartridge is achieved by a breaking ram which engages and urges the supply chamber of the cartridge in a direction substantially parallel to the spindle axis for breaking the supply chamber, most of the exposure platform, and the take-up chamber cap away from the take-up chamber and film spool, which remains on the spindle. Accordingly, substantially the entire lower and outer sides of the take-up chamber are open for the withdrawal of film from the spool.

FILM CARTRIDGE OPENING DEVICE

Filed April 2, 1973 2 Sheets-Sheet 1

FILM CARTRIDGE OPENING DEVICE

Filed April 2, 1973 2 Sheets-Sheet 2